United States Patent [19]

Coope et al.

[11] 4,073,215
[45] Feb. 14, 1978

[54] SUB PLATE ASSEMBLY FOR MACHINE TOOLS

[75] Inventors: Robert L. Coope; Lowell W. Munson, both of Phoenix, Ariz.

[73] Assignee: Stevens Engineering, Phoenix, Ariz.

[21] Appl. No.: 728,724

[22] Filed: Oct. 1, 1976

[51] Int. Cl.$^2$ .............................................. B23D 7/08
[52] U.S. Cl. .............................. 90/58 R; 90/DIG. 20; 269/321 A; 408/90
[58] Field of Search ................... 90/58 R, 58 A, 58 B, 90/58 C, DIG. 20; 269/15, 321 A; 408/87, 89, 90; 83/698; 403/388

[56] References Cited

U.S. PATENT DOCUMENTS

| | | | |
|---|---|---|---|
| 1,128,187 | 2/1915 | Raverty | 90/58 R |
| 1,903,865 | 4/1933 | Johnson | 90/58 R |
| 2,295,022 | 9/1942 | Yanchek | 408/90 X |
| 2,369,425 | 2/1945 | Becker | 408/89 X |
| 2,536,937 | 1/1951 | Hosea | 408/90 X |
| 3,942,780 | 3/1976 | Clement | 269/321 A X |
| 4,017,267 | 4/1977 | Hanley | 83/698 X |

Primary Examiner—Othell M. Simpson
Assistant Examiner—W. D. Bray
Attorney, Agent, or Firm—William H. Dean; Don J. Flickinger; John A. Robertson

[57] ABSTRACT

The disclosure relates to a tooling set up and subplate means for machine tools wherein a subplate is provided with intersecting rows of openings; said rows precisely intersecting each other at right angles and some of said openings having precision locating bushings therein and others of said fixture openings being internally screwthreaded fixture openings. The locating openings are in rows adapted to be precisely aligned with the two axes of movement of the machine tool table and hold down means adapted to secure said subplate on the machine tool table and tooling members having fixture receiving openings and locating openings adapted to coincide with the respective openings in said subplate so as to precisely align tooling with the movement axes of a machine tool and to thereby alleviate the time usually devoted to the alignment of a piece of work on a machine tool with respect to its directions of movement.

10 Claims, 7 Drawing Figures

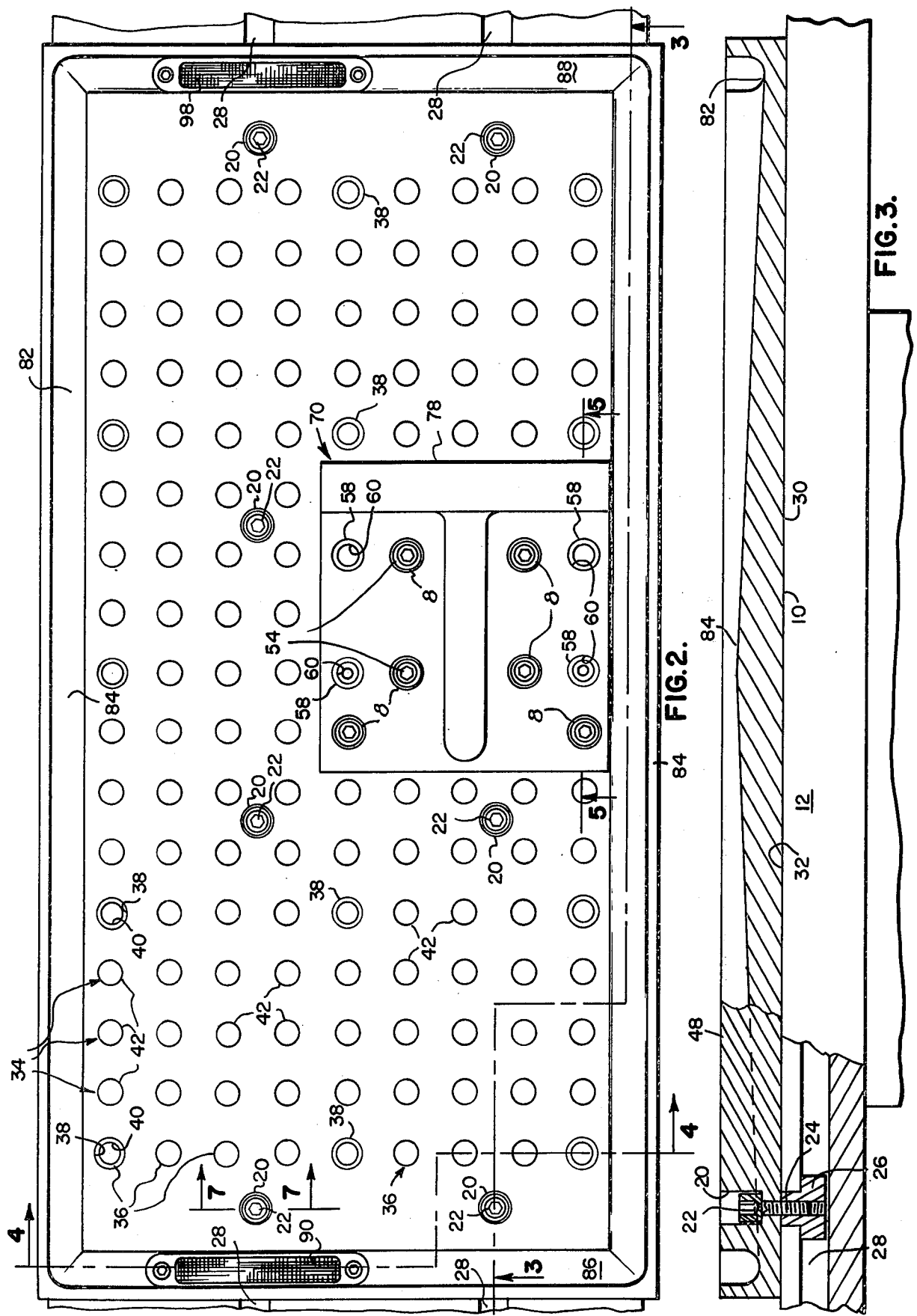

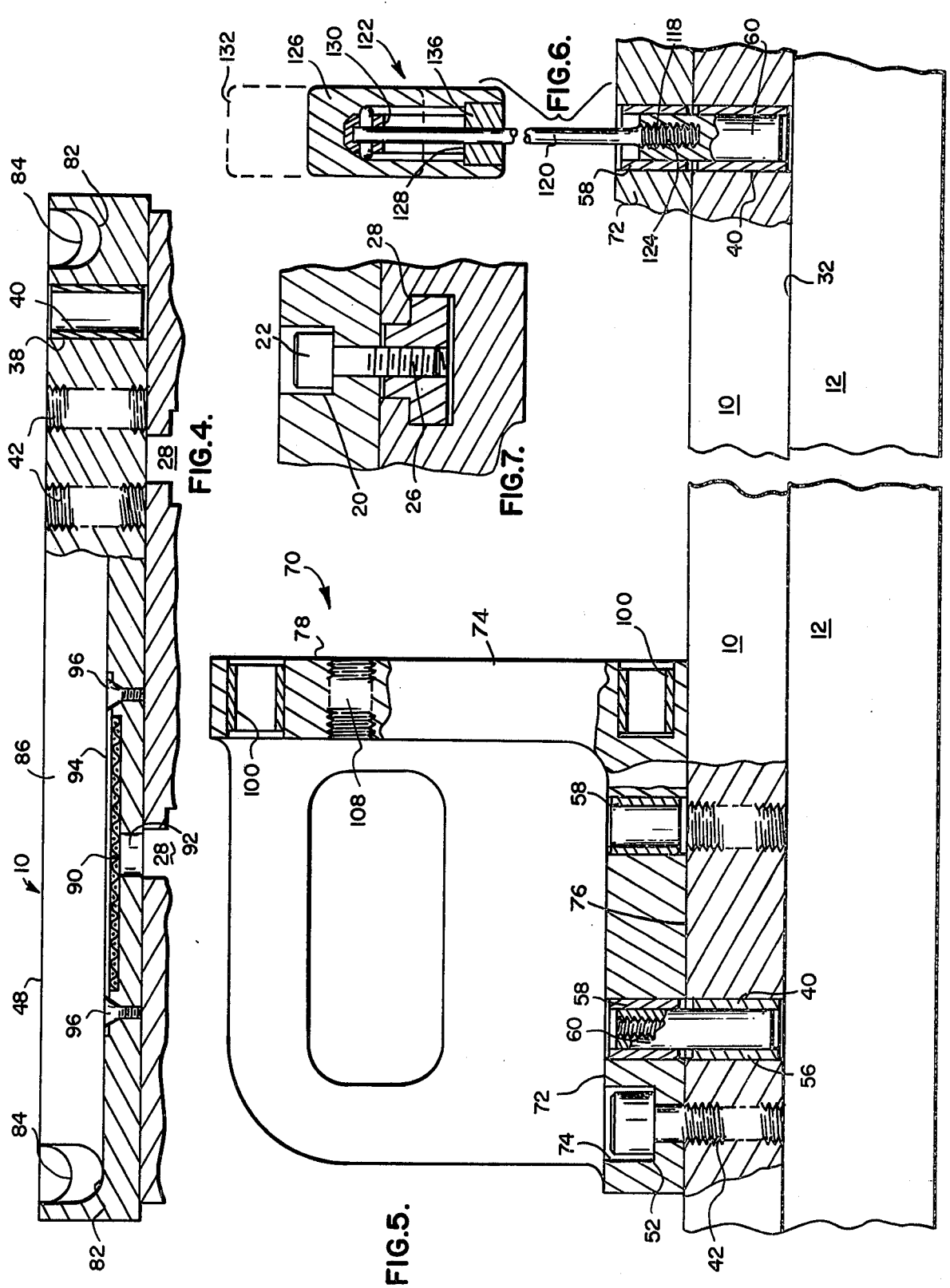

4,073,215

SUB PLATE ASSEMBLY FOR MACHINE TOOLS

BACKGROUND OF THE INVENTION

Various machine tools such as milling machines, jig boring machines or the like, are provided with work tables which move in two directions at right angles to each other and these tables are provided with the usual T-slots therein which permit the use of fixtures to clamp work on the respective table. Normally, the operation of precisely clamping work on said table is known as set up and oftentimes, the set up of work on a machine tool table requires a lot of meticulous positioning by the use of precision instruments in order to ascertain the precise location of the work on the table in relation to its longitudinal or lateral axes of movement. The means by which work is normally set up includes T-slot engaging nuts, with bolts screwthreaded therein, and extending upwardly above the upper surface of the table and through clamp blocks or bars which normally clamp the work or a work holding fixture on the table. Thus, the work is held on the table and must be manually adjusted until a dial indicator or other precision instrument can be used to precisely align the work for cutting or machining thereof by means of a cutting tool carried by a spindle of a machine tool.

The foregoing procedures of the prior art have been utilized in many instances to set up each part of a production run to be machined and such has been time consuming and expensive.

SUMMARY OF THE INVENTION

The invention comprises a precision subplate having pluralities of parallel rows of openings; said rows intersecting each other at the centers of such openings and at right angles; some of the openings being precision dowel receiving openings having hard wear resistant bushings therein and other openings being internally screwthreaded to receive screwthreaded fixtures. Tooling members are provided with similar dowel receiving openings having hard wear resistant bushings therein and with fixture receiving openings adapted to receive screwthreaded fixtures to be screwthreaded in the aforementioned screwthreaded holes in the subplate. The dowel receiving openings serve as precision locating openings and are provided with precision bushings therein adapted to receive precision dowels and these dowel receiving and locating openings are adapted precisely to locate a tooling member on the subplate after the subplate has been initially installed and aligned with the movement axes of the machine. Thus, the tooling member, with the precision bushed locating openings engaged by dowels, also precisely engaged in the precision bushings, in the locating openings of the subplate, afford means by which parts may be quickly and easily set up on a machine tool for machining without resorting to the tedious tasks of aligning certain features of the work with the movement axes of a machine tool table.

The aforementioned tooling member may be an angle plate having a horizontal surface engaging the aforementioned subplate. The tooling member may also have a vertical surface at right angles to the subplate and may be provided with various custom fixtures adapted to hold parts which may be machined one after another.

The aforementioned subplate is provided with openings through which hold down bolts are extended and these hold down bolts may be, for example, threaded into conventional T-slot engaging nuts which are disposed in the T-slots of a machine tool table. Each row of said openings comprises a plurality of said internally screwthreaded openings between adjacent ones of said locating openings which have precision bushings therein and the locating openings are spaced apart precisely the same distance in two directions at right angles to each other.

The aforementioned tooling member is provided with internally bushed locating openings spaced apart a distance equal to half the spacing of the locating openings in the subplate so as to provide for the disposition of the tooling member at locations modular to half the spacing of the locating openings in the subplate.

Accordingly, it is an object of the present invention to provide a tooling set up and subplate for machine tools which will save considerable set up time during machining operations on various machine tools such as milling machines, jig borers etc.

Another object of the invention is to provide a novel and highly precise tooling set up and subplate for machine tools wherein a subplate is adapted initially to be precisely aligned with and fixed to a machine tool table and wherein locating openings and fixture receiving openings are provided in the subplate so that tooling members may be precisely aligned with the movement axes of the machine tool by means of precision bushings and dowels in the subplate and the various tooling members that may be mounted thereon.

Another object of the invention is to provide a tooling set up and subplate which, when used in connection with machine tool tables, provides for great versatility in precision tooling used relative to production repeat machining operations.

Another object of the invention is to provide a tooling set up and subplate which provides basic set up facilities for a great variety of precision machining operations such that specific part holding tools may be produced for various machining operations and very quickly and easily secured in position on a machine tool table for either single operations or multiple high production operations.

Further objects and advantages of the invention may be apparent from the following specification, appended claims and accompanying drawings.

BRIEF DESCRIPTION OF THE DRAWINGS

FIG. 2 is a plan view of the subplate of the invention shown on a fragmentary portion of a machine tool table and illustrating a tooling member on the subplate; said tooling member being of a different size than the tooling member shown on the subplate in FIG. 1 of the drawings;

FIG. 3 is a fragmentary sectional view taken from the line 3—3 of FIG. 2;

FIG. 4 is a fragmentary sectional view taken from the line 4—4 of FIG. 2 showing the structure on an enlarged scale;

FIG. 5 is an enlarged fragmentary sectional view taken from the line 5—5 of FIG. 2;

FIG. 6 is an enlarged fragmentary sectional view of locating openings in the subplate and tooling member of the invention and showing precision bushings therein and a precision dowel engaged in the bore portions of the bushings and illustrating a pulling tool adapted for use in pulling the dowel out of the precision bushings; and FIG. 7 is an enlarged fragmentary sectional view taken from the line 7—7 of FIG. 2.

DESCRIPTION OF THE PREFERRED EMBODIMENTS

Figure 1:
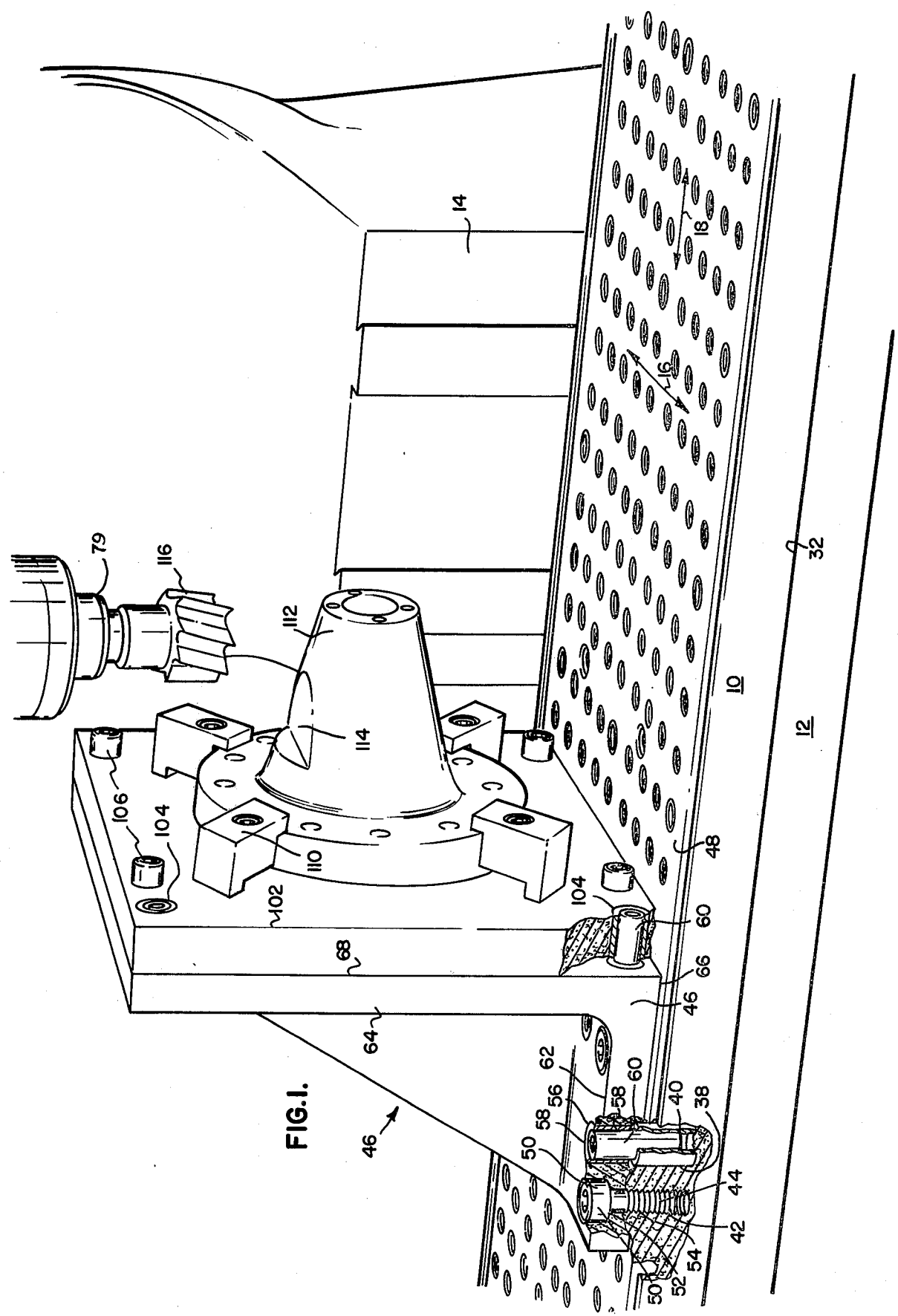
FIG. 1 is a fragmentary perspective view of a tooling set up and subplate of the invention shown in connection with a moveable table of a machine tool and illustrating a tooling member on a subplate and showing portions broken away and in section to amplify the illustration.

As shown in FIG. 1 of the drawings, a subplate 10 of the invention is mounted on a machine tool table 12 of a milling machine or the like. The table 12 is moveable on the frame 14 of the machine in opposite directions in accordance with an arrow 16, which opposite directions are laterally relative to the table 12 and the table 12 is moveable in opposite directions in accordance with an arrow 18 and this arrow 18 is in a direction at right angles to the arrow 16. The subplate 10 is provided with openings 20 in which hold down bolts 22 are disposed. As for example only, these hold down bolts 22 are provided with screwthreaded portions 24 screwthreaded into conventional T-slot engaging nuts 26 which are disposed in conventional T-slots 28 in the machine tool table 12.

These T-slots 28 are conventional and are also shown in FIGS. 4 and 7 of the drawings; it being noted that FIG. 4 does not disclose all of the T-slots in the area of the section shown in FIG. 4.

Accordingly, a lower surface 30 of the subplate 10 is flat and engaged and held down upon an upper surface 32 of the machine tool table 12. The bolts 22 are only finally tightened when the subplate 10 is properly aligned relative to the directions of the arrows 16 and 18, as will be hereinafter described in detail.

As shown in FIGS. 1 and 2 of the drawings, the subplate 10 is provided with a plurality of rows 34 of openings. These straight rows 34 are adapted to be aligned with the direction indicated by the arrow 16 and a plurality of rows of openings 36 are disposed at right angles to the rows 34 and each row of openings 34 intersect the rows of openings 36 such that the rows intersect at right angles and at the centers of the openings.

Disposed in each of the rows 34 are locating openings 38 in which precision bushings 40 are precisely fitted.

These locating openings 38 are disposed in modular spacing at intersections of the rows 34 and 36 and disposed between each adjacent pair of openings 38 are fixture receiving openings 42; there being three fixture receiving openings 42 between each adjacent pair of the locating openings 38. The locating openings 38 in the rows 36 are spaced apart the same distance as the locating openings 38 of the rows 34.

As shown in FIGS. 1 and 5 of the drawings, each fixture receiving opening 42 is internally screwthreaded and is adapted to receive an externally screwthreaded bolt or fixture 44 such as an allen head bolt, shown best in FIG. 1 of the drawings. These bolts 44 are adapted to fix a tooling member 46 onto the upper surface 48 of the subplate 10; each bolt 44 being provided with a head 50 engaged in a counter bored portion 52 of the tooling member 46 and these counter bored portions 52 being a portion of a fixture receiving opening 54 extending through the tooling member 46.

The tooling member 46 is also provided with locating openings 56 having precision bushings 58 therein; these bushings 58 being similar to the bushings 40 engaged in the locating openings 38 of the subplate 10.

A precision dowel 60 interengages internal bore portions of the bushings 40 and 58 and these bore portions are very precise requiring a push fit of the dowels 60 therein so as to precisely locate the tooling member 46 with relation to the subplate 10.

It will be noted that the tooling member 46, shown in FIG. 1, is a large angle plate structure having a horizontal portion 62 and a substantially vertical portion 64; the horizontal portion 62 having a lower surface 66 and the substantially vertical portion 64 having a vertical surface 68.

As shown in FIG. 2 of the drawings, a smaller tooling member 70 is disclosed and this tooling member 70 is also shown in FIG. 5 of the drawings on an enlarged scale. The tooling member 70 is of the angle plate configuration having a horizontal portion 72 and a vertical portion 74; these portions 72 and 74 having flat surfacers 76 and 78 respectively. The surface 76 is secured to the upper surface 48 of the subplate 10 and the vertical surface 78 being adapted for use in locating tooling relative to the subplate 10 and the machine tool table 12, all as will be hereinafter described.

The tooling member 70 in its portion 72 is provided with a plurality of counter bored portions 52 similar to that shown in FIG. 1 in which allen bolts 8 are disposed and these allen bolts 8 extend through the horizontal portion 72 of the tooling member 70 and into the internally screwthreaded fixture openings 42 of the subplate 10.

The bolts 74 are only finally tightened after dowels 60 have been extended through the bushings 58 and 40 in the tooling member 70 and the subplate 10 respectively.

The subplate 10 may be aligned with the directions table movement as indicated by the arrows 16 and 18 by placing a dial gage in a spindle 79 of a machine tool shown in FIG. 1 of the drawings and then by moving the table 12 back and forth in the direction of the arrows 16 and engaging the vertical surface 78 of the tooling member 70 with the sensing element of said dial gage and when the surface 78 is indicated in precise alignment with the direction of movement as indicated by the arrow 16, the bolts 22 may be tightened fixing the subplate precisely and securely on the maching tool table 12. The precision bushings 40 in the locating openings 38 are precisely aligned with each other laterally of the subplate 10 and the corresponding bushings 58 in the tooling member 70 are interengaged by the dowels 60 such that the surface 78 of the tooling member 70 is precisely at right angles to the rows of openings 36 in which the locating openings 38 are precisely spaced on a modular basis.

Each bushing 40 and each bushing 58 is provided with a precision bore in which the respective dowel 60 is precisely fitted and thus, the tooling member 70 or the tooling member 46 may be very quickly placed and precisely located on the subplate 10 by inserting the dowels 60 as hereinbefore described. The bolts 44 are then tightened until the heads 50 thereof engage the counter bored portions 52 of the fixture receiving openings 54, all as shown best in FIG. 1 of the drawings.

It will be seen that the tooling member 46 is of a size extending the full width of the subplate 10, while the tooling member 70 shown in FIG. 2 of the drawings is about half the size of the tooling member 46.

The spacing of the locating openings 58 in the tooling member 70 is equal to half the distance between the locating openings 38 in the subplate 10 so as to provide a modular means for locating the face 78 of the tooling member 70 in modular locations which equal half the distance between the locating openings 38 in the subplate 10.

The subplate 10 is provided with a drain trough 82 recessed in the upper surface thereof. This drain trough surrounds the array of openings constituted by the rows of openings 34 and 36 and the trough is declined from a central area 84 on each side toward the respective opposite ends 86 and 88. The end portion 86 of the trough 82 which is shown in FIG. 4 is provided with a screen like chip retainer 90 which communicates with a trough outlet opening 92 and prevents chips from passing thereinto; the opening 92 being aligned with one of the T-slots 28 in the machine tool table 12. The screen 90 is held by a frame 94 secured by screws 96 to the subplate 10. A screen 98, similar to the screen 90, is disposed in the end trough portion 88 as shown in FIG. 2 of the drawings and thus, the screens 90 and 98 communicate with openings similar to the openings 92 shown in FIG. 4 of the drawings for draining cutting oil or coolant which passes from the surface of the substrate 10.

The tooling member 70, in its vertical portion 74, is provided with precision bushings 100 similar to the bushings 58 and 40 hereinbefore described; and these bushings 100 are adapted to receive one of the dowels 60 for locating various tooling on the vertical face 78 of the tooling member 70.

Referring to a similar arrangement in FIG. 1 of the drawings, it will be seen that a special tooling plate 102 is provided with bushings 104 similar to the bushings 100 such that the tooling plate 102 may be precisely aligned with the complemental vertical surface portion 68 of the tooling member 46 and screwthreaded fixtures 106 extend into screwthreaded openings such as the screwthreaded openings 108 shown in FIG. 5, which are similar to the hereinbefore described internally screwthreaded openings 42.

As shown in FIG. 1, it will be seen that the plate 102 may be provided with precise fixtures 110 for holding a specific part 112 for machining a portion 114 thereof by means of a cutter 116.

Various tooling may be provided which may be secured on an angle plate tooling member such as the tooling member 46 or the tooling member 70 for precision set up and repeat operations during production of many parts or a few as desired.

It will be understood that the subplate 10 is initially fixed in position by indicating it in accordance with the movement direction as indicated by the arrows 16 and 18 and the bolts 22 are finally tightened when the plate is indicated in such alignment; this being accomplished as shown in FIG. 7 of the drawings by tightening the allen bolts 22 in connection with internally screwtheaded T-slot engaging nuts 26 in the conventional T-slots 28.

As shown in FIG. 6 of the drawings, one of the dowels 60 is shown engaging bushings 40 and 58; the dowel 60 being closely fitted in precision bores in these bushings and when it is desired to remove a dowel 60 from these bushings, a tool 122 provided with a shank 120 and an externally screwtheaded stub 118 is screwtheaded in the internally screwthreaded portion 124 of the bushings; the tool 122 having a reciprocating handle 126 which has a bore 128 in which a flange member 130 on the shank 120 is fixed such that the handle 126 is moved to a broken line position 132 repeatedly causing an end block 136 to cause impact against the washer 130 on the shank 120 and thereby causing impact force to retract the respective dowel 60 from the bushings 40 and 58.

It will be obvious to those skilled in the art that various modifications of the invention may be resorted to without departing from the spirit thereof.

I claim:

1. A tooling setup and subplate means for machine tools comprising: a flat subplate adapted to be supported on and fixed to a conventional flat table of a machine tool; said subplate having an array of openings therein; said openings being in straight parallel spaced apart rows which rows intersect each other at right angles and at centers of said openings; first ones of said openings being internally screwthreaded fixture receiving openings; second ones of said openings being locating openings; each locating opening provided with a first precision bore; a hollow cylindrical bushing precisely engaged in said bore; each bushing having a second precision bore; said locating openings being precisely spaced apart an equal distance in two directions; said directions being 90 degrees apart; a tooling member removeably secured to said subplate; said tooling member having a first portion; said first portion having a first surface engaging said subplate; said first portion provided with fixture receiving openings spaced apart to coincide with said fixture receiving openings in said subplate; said tooling member also having locating openings in said first portion; said last mentioned locating openings spaced apart to coincide with said locating openings in said subplate; said last mentioned locating openings each having a third precision bore; a hollow cylindrical bushing precisely engaged in said last mentioned bore; said last mentioned bushing having a fourth precision bore; and precision dowels precisely interengaged in both the precision bores; in said bushings which are disposed in the locating openings of said subplate and the locating openings in said tooling member.

2. The invention as defined in claim 1, wherein: said fixture receiving openings in said subplate are internally screwthreaded; said fixture receiving openings in said tooling member being bolt clearance holes.

3. The invention as defined in claim 1, wherein: a plurality of said fixture receiving openings are disposed between adjacent ones of said locating openings.

4. The invention as defined in claim 2, wherein: a plurality of said fixture receiving openings are disposed between adjacent ones of said locating openings.

5. The invention as defined in claim 1, wherein: said dowels are each provided with an internally screwthreaded bore adapted to receive an externally screwthreaded puller member for use when removing said dowels from the precision bores of said precision bushings.

6. The invention as defined in claim 1, wherein: said intersecting rows of openings are equally spaced apart and at right angles to each other.

7. The invention as defined in claim 1, wherein: said subplate is provided with a recess drain trough in the upper surface thereof; said drain trough surrounding said array of openings; said drain trough having a fluid outlet disposed so as to coincide with a conventional fixture receiving T-slot of a machine tool table.

8. The invention as defined in claim 7, wherein: a chip collecting screen is disposed over said fluid outlet.

9. The invention as defined in claim 1, wherein: said tooling member is provided with a second portion having a second surface disposed at an angle to said first surface; said second portion of said tooling member having fixture receiving openings and locating openings similar to those in said first portion; said last mentioned openings communicating with said second surface.

10. The invention as defined in claim 1, wherein: said locating openings in said tooling member are spaced apart half the distance between said locating openings in said subplate to provide modular positioning of said tooling member on said subplate.